United States Patent [19]

Mortl et al.

[11] 4,021,254

[45] May 3, 1977

[54] REFRACTORIES USING BORIC ACID AND WATER SOLUBLE ALCOHOL BINDER

[76] Inventors: Günther L. Mortl, Zeno Goesstrasse 40, Villach, Austria, 9500; Johann Lederer, Millstaetterstrasse, Radenthein, Austria, 9545

[22] Filed: Mar. 19, 1976

[21] Appl. No.: 668,449

[30] Foreign Application Priority Data

Mar. 25, 1975 Austria .............................. 2264/75

[52] U.S. Cl. .................................. 106/58; 106/59
[51] Int. Cl.$^2$ .................. C04B 35/04; C04B 35/42
[58] Field of Search .............................. 106/58, 59

[56] References Cited

UNITED STATES PATENTS

| 2,999,759 | 9/1961 | Heuer | 106/59 |
| 3,241,987 | 3/1966 | Dreyling et al. | 106/58 |
| 3,279,933 | 10/1966 | Martinet | 106/59 |

*Primary Examiner*—J. Poer
*Attorney, Agent, or Firm*—Finnegan, Henderson, Farabow & Garrett

[57] ABSTRACT

Refractory materials such as magnesia and mixtures of magnesia and chromite are formed into refractory compositions or unburnt brick utilizing a binder containing a mixture of boric acid and a water-soluble polyhydric alcohol.

7 Claims, No Drawings

REFRACTORIES USING BORIC ACID AND WATER SOLUBLE ALCOHOL BINDER

BACKGROUND OF THE INVENTION

The present invention relates to refractory mixtures containing magnesia or mixtures of magnesia and chromite formed into compositions or unburnt bricks utilizing boric acid as one primary component of the binder.

In the formation of refractory compositions and unburnt bricks from magnesia and mixtures of magnesia and chromite, a binder is required to give the refractory mixture sufficient strength to retain its shape and configuration and to withstand its environment until the refractory material reaches a temperature sufficient to initiate ceramic bonding of its particulate constitutents. Therefore, the binder for such materials should bond the constitutents rapidly at low temperatures with sufficient strength to withstand the mechanical and thermal environment. Further, the strength of the article should be maintained while the refractory materials are being heated, as for example, when an industrial furnace lined with such materials is heated to pass through intermediate temperatures and then to form the ceramic bond in the lining. Formation of the ceramic bond occurs after passing through intermediate temperatures which are typically called "intermediate zone".

Organic binders such as spent sulphite liquor loose their bonding action at relatively low temperatures and therefore exhibit poor intermediate zone strength, i.e., poor strength at medium temperatures before the formation of the ceramic bond.

Two basic forms of refractory articles are formed from such materials: refractory compositions, which for purposes of this application shall be defined as formable mixtures of refractory compounds, and refractory brick which needs no definition for those familiar with the art. There are difficulties in the use of binders for refractory compositions that are not present for the binders utilized to form bricks from refractory materials. Therefore, there are binders that are suitable for the manufacture of brick that are unsuitable when used in refractory compositions. An example of the different response of binders to the end product formed is shown where sulphuric acid and phosphoric acid demonstrate suitable characteristics of the binder for refractory brick but are unsuitable as a binder for refractory compositions. Similarly, boric acid is not suitable as a binder for refractory compositions since it yields a good intermediate zone strength but practically no bond strength at all at low temperatures.

It is also known to use a mixture of chromic acid or chromites and boric acid as a binder for refractory compositions. The major disadvantage of such materials is that the chromium compounds are a health hazard and the use of chromium compounds as a binder for refractory products is prohibited by regulation in a number of countries.

SUMMARY OF THE INVENTION

The present invention comprises a refractory mixture of magnesia or mixtures of magnesia and chromite utilizing a binder of boric acid and a water soluble polyhydric alcohol.

Preferably, the polyhydric alcohol is either ethylene glycol or glycerin.

The mixtures of the present invention eliminate the difficulties associated with the binding of refractory materials into unburnt brick or refractory compositions by providing a binder having strength to form the article both at low and intermediate temperatures without posing a health problem. The maintenance of the bond through the low and intermedite temperatures affords the formed article or refractory composition the ability to achieve a ceramic bond at higher temperatures.

A further advantage of the present invention is the reduction of the amount of boric acid necessary to make an operable binder. Additional advantages of the invention will be set out in the description which follows, and in part, will be obvious from the description, or may be learned by practice of the invention. The advantages of the invention may be realized and attained by means of the combinations particularly pointed out in the appended claims.

DESCRIPTION OF THE PREFERRED EMBODIMENT

Reference will now be made to the present preferred embodiments of the invention.

In accordance with the purposes of the invention, refractory mixtures of the present invention are formed of either magnesia or mixtures of magnesia and chromite utilizing a binder containing a mixture of boric acid and polyhydric water soluble alcohols.

Preferably, the alcohol component of the binder is ethylene glycol or glycerin, but other water soluble glycols like butylene glycol or multivalent alcohols like hexites or sugar compounds may also be used. In addition, mixtures of several water soluble polyhydric alcohols are operable in the present invention.

For refractory compositions, the boric acid content of the binder is preferably an amount of from 0.1 to 5 weight percent. In refractory bricks, it is preferred that the boric acid be in the range of from 0.1 to 2 weight percent. By contrast, the polyhydric alcohol content of the binder is in the range of from 0.2 to 20 percent for the mixtures either being the form of bricks or refractory compositions.

The present invention is more completely understood and disclosed by reference to the following specific examples. In the examples all percentages are weight percent unless explicitly stated otherwise. While the magnesia and chromite used in the examples is disclosed as having other compounds included therein, the presence of these other compounds is not known to be critical to the operation of the invention. The invention is generally applicable to magnesia or mixtures of magnesia and chromite irrespective of minor amounts of normally present impurities.

EXAMPLE I

A sintered magnesia starting material of the following composition:

$SiO_2$ — 4.20%
$Fe_2O_3$ — 0.15%
$Al_2O_3$ — 0.20%
$CaO$ — 1.47%
$MgO$ — 93.98% was used. The starting material had a particle size in the range of from 0+ to 2 mm. Five samples were formed from the particulate magnesia utilizing various binders and in each case the percentages expressed were calculated on the basis of adding binder materials to 100% starting material. In other words, the weight of the binder additions as expressed as percentages is calculated in relation to the weight of the starting material not the combined weight of the starting material and binder.

sample 1: 3% caustic burnt magnesia and 1% boric acid ($H_3BO_3$)
sample 2: 3% caustic burnt magnesia and 2% boric acid
sample 3: 3% caustic burnt magnesia and 1% $H_3BO_3$ and 2.5% ethylene glycol
sample 4: 3% caustic burnt magnesia and 2% $H_3BO_3$ and 2.5% ethylene glycol
sample 5: 3% caustic burnt magnesia and 1% $H_3BO_3$ and 2% chromic anhydride ($CrO_3$)

Two and one-half percent water was added to the mixtures of samples 1 through 4 and 4 percent water added to the mixture of sample 5. Thereafter, the mixtures were pressed into test cylinders of 50 mm diameter and 50 mm height at a pressure of 19.6 Newtons per square mm.

The resulting cylinders were heated for 24 hours to 383, 1073, 1273, 1473, 1673, and 1928 degrees Kelvin for each test. The cold compressive strength (CCS) of each of the cylinders after this heating step was then measured at room temperture. In addition to the room temperature strength of these cylinders (CCS) their high temperature compressive strength was also measured. The high temperature strength being termed "refractoriness under load" (RUL). The results of the tests are as follows:

TABLE I

| | Cold Compressive Strength (CCS) in N/mm² after heating to | | | | | |
|---|---|---|---|---|---|---|
| | 383 | 1073 | 1273 | 1473 | 1673 | 1928 degK |
| sample 1: | 4.6 | 2.3 | 7.7 | 15.1 | 36.0 | 38.7 |
| sample 2: | 6.7 | 7.3 | 11.5 | 20.3 | 39.0 | 36.0 |
| sample 3: | 16.8 | 5.5 | 17.2 | 24.0 | 43.4 | 56.4 |
| sample 4: | 21.6 | 11.0 | 21.0 | 27.3 | 39.6 | 50.7 |
| sample 5: | 31.0 | 16.0 | 18.0 | 22.4 | 25.0 | 26.3 |

TABLE II

| | High Temperature Compressive Strength | | | | |
|---|---|---|---|---|---|
| | $t_o$ | $t_n$ | $t_s$ | max. temp. of test | % vol. change |
| sample 1: | 1803 | 1883 | 1898° K | | |
| sample 2: | 1768 | 1861 | 1863 | | |
| sample 3: | | | | 1973° K | 0.0% |
| sample 4: | | | | 1973 | 0.1 |
| sample 5: | 1808° K | | | 1973 | 0.5 | where
$t_o$ — temperature at maximum expansion
$t_n$ — temperature at 0.6% shrinkage
$t_s$ — temperature at maximum shrinkage The above results indicate that a bond formed with boric acid and ethylene glycol yields low temperature strength values which are slightly inferior to those of the bond with boric acid and chromic acid. At medium and high temperatures, however, the bond with boric acid and ethylene glycol yields strengths that are far superior to the comparative example. In addition, the performance of the various samples clearly show that the bond with a mixture of boric acid and alcohol is far superior to the use of boric acid alone. The example also illustrates that the glycol addition to the binder increases the high temperature strength values at increasing temperatures. The high temperature strength values are particularly important since they represent values of the product at the temperature of application and illustrate that the boric acid-ethylene-glycol-bond is far superior to other compositions at high temperatures.

EXAMPLE II

This example relates to a comparison of refractory materials formed into unburnt bricks containing additional binders together with spent cellulose liquor and kierserite solution. The bricks formed according to the present invention contain a binder containing a mixture of boric acid and glycerin and for comparison purposes, the other unburnt bricks contain only the boric acid. The comparative tests illustrate that the mixture of boric acid and polyhydric alcohol is also suitable binder for unburnt bricks. The example further illustrates that by adding the water soluble polyhydric alcohols to the boric acid binder, it is possible to increase the intermediate zone strength and that smaller amounts of boric acid are required to obtain the same intermediate zone strength utilizing the addition of polyhydric water soluble alcohols rather than the sole binder composition being boric acid.

For comparative illustration, a chemically bonded brick of sintered magnesia and chromite was formed of starting materials of the following compositions:

| Sintered Magnesia | |
|---|---|
| $SiO_2$ | 2.84% |
| $Fe_2O_3$ | 3.93% |
| $Al_2O_3 + Mn_3O_4$ | 0.97% |
| CaO | 1.94% |
| MgO | 90.32% |
| | |
| Chromite | |
| $SiO_2$ | 3.5% |
| $Fe_2O_3$ | 16.0% |
| $Al_2O_3$ | 14.9% |
| $Cr_2O_3$ | 49.1% |
| CaO | 0.2% |
| MgO | 16.3% |

The brick compositions were 65% sintered magnesia, the magnesia having a grain size in the range of from 0+ to 3 mm. The grain size of the chromite portion was from 0.3 to 4 mm and constituted 35% of the brick mixture. From a mixture of these materials, two brick mixtures were formed differing only by the following compositions:

Mixture A
35% chromite, 65% sintered magnesia into which is added 1.2% dry spent sulphite cellulose liquor plus 0.6% boric acid plus 2.5 (by volume) kieserite solution.

Mixture B
the same mixture of magnesia and chromite has added thereto 1.2% dry spent sulphite cellulose liquor, 0.4% boric acid, 0.4% glycerin and 2.5% (by volume) kierserite solution.

From these mixtures were produced bricks at a pressure of 125 Newtons per square mm with the properties of each of the bricks determined in its original state and after heating for 24 hours to 1073° and 1273° Kelvin, the following values were obtained:

TABLE II

| | CCS, N/mm² original state | CCS after heating to 1073 degK | CCS after heating to 1273 degK |
|---|---|---|---|
| Mixture A | 77.0 | 26.0 | 40.0 |
| Mixture B | 86.4 | 32.8 | 46.4 |

The above tests indicate the brick mixture B has a much superior strength value in the original state, in the intermediate zone (after heating to 1073° and 1273° kelvin) than the bricks made of Mixture A, despite the reduced content of boric acid. As the example illustrates, the present invention permits the use of smaller amounts of boric acid.

The present invention has been disclosed by way of specific examples and one skilled in the art can deviate from the examples disclosed and remain within the scope of the invention as it is defined by the appended claims.

What is claimed is:

1. A refractory material comprising magnesia or mixtures of magnesia and chromite, said refractory material including a binder comprising of a mixture of boric acid and a water soluble polyhydric alcohol.

2. The refractory mixture of claim 1 wherein said mixture is formed into a refractory composition.

3. The refractory mixture of claim 1 wherein said refractory mixture is formed into unburnt bricks.

4. The refractory mixture of claim 1 wherein said polyhydric alcohol is selected from a group consisting of ethylene glycol or glycerin.

5. The refractory mixture of claim 2 wherein said mixture contains from 0.1 to 5% boric acid.

6. The refractory mixture of claim 3 wherein said unburnt bricks contain a binder including from 0.1 to 2% boric acid.

7. The refractory mixture of claim 1 wherein the mixture contains from 0.2 to 20 weight percent polyhydric alcohol.

* * * * *